No. 865,690. PATENTED SEPT. 10, 1907.
W. J. FOSTER.
BUGGY BODY EXTENSION AND REAR SEAT ATTACHMENT.
APPLICATION FILED DEC. 27, 1906.
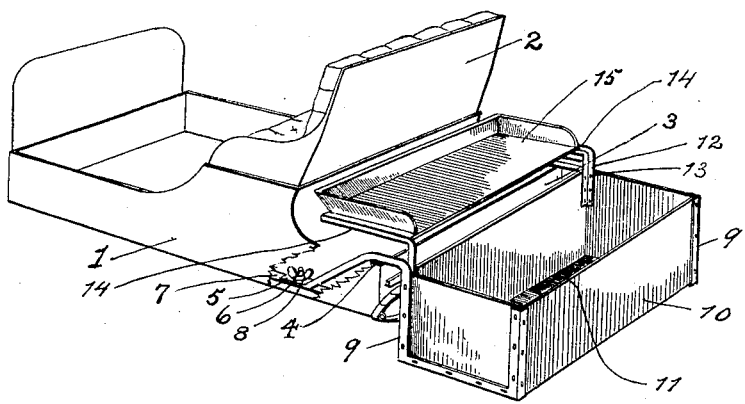
Witnesses:
J. A. Scott
W. L. Cruickshank
Inventor:
Walter J. Foster
By Clement R. Stickney
Attorney

UNITED STATES PATENT OFFICE.

WALTER J. FOSTER, OF PORT HURON, MICHIGAN.

BUGGY-BODY EXTENSION AND REAR-SEAT ATTACHMENT.

No. 865,690.   Specification of Letters Patent.   Patented Sept. 10, 1907.

Application filed December 27, 1906. Serial No. 349,716.

*To all whom it may concern:*

Be it known that I, WALTER J. FOSTER, a citizen of the United States of America, and a resident of the city of Port Huron, St. Clair county, State of Michigan, have invented certain new and useful Improvements in Buggy-Box Extensions and Rear-Seat Attachments, of which the following is a full, clear, and exact specification.

This invention relates to extensions for carrying parcels and the like, adapted to be detachably secured to the rear end of any form of buggy box which has its rear portion extending open and straight behind the single seat of the vehicle, after the manner of a piano box buggy, together with an auxiliary seat of the dos-à-dos type, for which the extension may form a foot rest.

The invention consists in the matters hereinafter set forth, and more particularly pointed out in the appended claims.

Referring to the drawings, the figure is a view in perspective, partially broken away, of a buggy box fitted with an extension embodying the features of the invention.

In the drawing, 1 represents a buggy box, with a central single seat 2, and an upright follow-board 3 and corner posts 4 in rear of the seat.

A pair of oppositely disposed angle irons are each secured near their forward ends 5 to the bottom of the box by bolts 6 passing up through the box sills 7 and butterfly nuts 8 or other suitably shaped hand-burs, and spring obliquely back and up, and then horizontally over the upper ends of the corner posts 4, on which they ride. Said angles are sharply bent at right angles into the form of double-L-shaped hooks which form corner and bottom irons 9 in which is suspended a rectangular receptacle 10, preferably of the full width of the buggy box, and with its bottom board 11 slightly below the box bottom, to increase the capacity of the attachment, as well as make it more suitable for a foot rest, if desired.

A pair of oppositely-disposed, L-shaped angle irons 12 are bolted or otherwise suitably detachably secured to the respective inner corners of the receptacle by bolts 13 or the like passing through the inner, upright limbs of the main angles, with their longer legs 14 extending forwardly over the rear of the buggy box, and forming supports for a suitably designed seat 15 arranged back to back with the buggy seat 2.

By this disposition and arrangement of parts, an attachment increasing the capacity of the ordinary buggy box and affording a detachable, resilient dos-à-dos seat is obtained, which is secured in place without marring the box or disfiguring it in any way, the support of the receptacle and seat being such that the vibration of the parts cannot chafe the finish of the parts, save at the top of the corner posts which may be inconspicuously ironed to resist wear. The receptacle is readily reached from the front seat, and affords a dust-proof foot-rest for the auxiliary seat.

Another feature is the application of the additional load almost directly to the sills of the main box, thereby communicating all strain to the proper hangers, so that the device does not rack the box proper. It is readily removed in whole or in part so as to leave the buggy clear, or with a luggage carrier without the seat.

Obviously the device is readily adaptable to any vehicle having upright, fixed rear corner posts, and I do not limit myself to any particular form or arrangement of parts save as set forth in certain of the appended claims.

I claim as my invention:—

1. The combination with a vehicle body having a central seat and upright, fixed, rear corner posts, of a luggage carrier and auxiliary seat comprising a rectangular receptacle of the width and at least the depth of the vehicle box, secured in rear thereof and at an interval therefrom by a pair of oppositely disposed angle irons each bent between its ends to form corner end and bottom irons for the box, extending horizontally over and bearing down on the tops of the rear corner posts of the vehicle body, and secured thereto at their forward ends by bolts passing up through the vehicle body sills and hand burs thereon, and a seat supported by L-shaped angle irons whose upright legs are detachably bolted to the inner upright legs of the carrier irons and whose horizontal legs extend forward over and clear of the vehicle box.

2. The combination with a vehicle body having a central seat and upright, fixed, rear corner posts, of a pair of oppositely disposed angle irons whose forward ends are detachably secured to the upper side of the outer vehicle sills by bolts passing through the sills and irons and hand burs, whose middle portions are bent to extend horizontally over and bear on the upper ends of the rear corner posts, and whose rear portions beyond the vehicle posts are bent at right angles to form double-L-shaped supporting stirrups, a luggage carrier having the width of the vehicle box supported by the rear portions of said angle irons which form side and bottom corner irons therefor, L-shaped angle irons whose shorter vertical legs are detachably secured against the inner forward corners of the carrier by bolts passing through the legs and through the carrier corner irons, and whose horizontal, longer legs extend forwardly over and clear of the rear of the vehicle body, and a seat dos-à-dos with the vehicle seat secured on the horizontal legs of said angle irons.

WALTER J. FOSTER.

Witnesses:
ALEX. J. STEWART,
JOHN V. FRENCH.